(12) United States Patent
Kenoyer et al.

(10) Patent No.: US 8,477,173 B2
(45) Date of Patent: Jul. 2, 2013

(54) HIGH DEFINITION VIDEOCONFERENCING SYSTEM

(75) Inventors: Michael L. Kenoyer, Austin, TX (US); Craig B. Malloy, Austin, TX (US)

(73) Assignee: LifeSize Communications, Inc., Austin, TX (US)

( * ) Notice: Subject to any disclaimer, the term of this patent is extended or adjusted under 35 U.S.C. 154(b) by 1977 days.

(21) Appl. No.: 11/305,845

(22) Filed: Dec. 16, 2005

(65) Prior Publication Data

US 2006/0158509 A1     Jul. 20, 2006

Related U.S. Application Data

(63) Continuation-in-part of application No. 11/252,238, filed on Oct. 17, 2005, now Pat. No. 7,692,683.

(60) Provisional application No. 60/676,905, filed on May 2, 2005, provisional application No. 60/619,210, filed on Oct. 15, 2004.

(51) Int. Cl.
*H04N 7/15* (2006.01)

(52) U.S. Cl.
USPC .................. 348/14.08; 348/14.09; 348/14.12

(58) Field of Classification Search
USPC ...................... 348/14.01–14.16; 370/260–261
See application file for complete search history.

(56) References Cited

U.S. PATENT DOCUMENTS

| | | | |
|---|---|---|---|
| 3,542,947 A | 11/1970 | Thurston | |
| 5,528,740 A | 6/1996 | Hill et al. | |
| 5,617,539 A | 4/1997 | Ludwig et al. | |
| 5,654,759 A | 8/1997 | Augenbraun et al. | |
| 5,689,641 A | 11/1997 | Ludwig et al. | |
| 5,719,540 A | 2/1998 | Takaoka et al. | |
| 5,751,338 A | 5/1998 | Ludwig, Jr. | |
| 5,757,424 A | 5/1998 | Frederick | |
| 5,831,666 A | 11/1998 | Palmer et al. | |
| 6,043,844 A | 3/2000 | Bist et al. | |
| 6,173,069 B1 | 1/2001 | Daly et al. | |
| 6,301,370 B1 | 10/2001 | Steffens et al. | |
| 6,594,688 B2 | 7/2003 | Ludwig et al. | |
| 6,614,474 B1 | 9/2003 | Malkin et al. | |

(Continued)

OTHER PUBLICATIONS

"A history of video conferencing (VC) technology" http://web.archive.org/web/20030622161425/http://myhome.hanafos.com/~soonjp/vchx.html (web archive dated Jun. 22, 2003); 5 pages.

(Continued)

*Primary Examiner* — Melur Ramakrishnaiah
(74) *Attorney, Agent, or Firm* — Meyertons Hood Kivlin Kowert & Goetzel, P.C.; Jeffrey C. Hood (57) ABSTRACT

In some embodiments, a videoconferencing system may support using high definition images (e.g., 1280×720 pixels) for high definition displays. The videoconferencing system comprises a plurality of participant locations that may participate in the videoconference. Each participant location may comprise videoconferencing equipment, such as at least one camera, microphone(s), a display, one or more speakers, and a videoconferencing codec. The camera may be a high definition camera operable to acquire or capture images having a high resolution compatible with HDTV. In one embodiment, the videoconferencing equipment comprises a H.264 encoder and is operable to encode the video stream of high definition images using H.264 encoding techniques. In one embodiment the network may be 1.544 MB or less (e.g., T1 or less). In another embodiment, the network is 2.048 MB or less.

15 Claims, 7 Drawing Sheets

U.S. PATENT DOCUMENTS

| | | | |
|---|---|---|---|
| 6,717,578 | B1 | 4/2004 | Deering |
| 6,816,904 | B1 | 11/2004 | Ludwig et al. |
| 6,850,265 | B1* | 2/2005 | Strubbe et al. ............ 348/14.05 |
| 6,850,565 | B2 | 2/2005 | Martins et al. |
| 6,865,374 | B2* | 3/2005 | Kalluri ........................... 455/65 |
| 7,130,446 | B2 | 10/2006 | Rui et al. |
| 2003/0174146 | A1 | 9/2003 | Kenoyer |
| 2004/0119814 | A1* | 6/2004 | Clisham et al. ............ 348/14.08 |
| 2004/0183897 | A1 | 9/2004 | Kenoyer et al. |
| 2005/0021620 | A1* | 1/2005 | Simon et al. ................. 709/204 |
| 2005/0024484 | A1* | 2/2005 | Leonard et al. ............ 348/14.01 |
| 2005/0259144 | A1* | 11/2005 | Eshkoli ...................... 348/14.07 |

OTHER PUBLICATIONS

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; http://www.video.ja.net/intro/; 2001; 26 pages.

Elan Amir, Steven McCanne, and Hui Zhang; "An Application Level Video Gateway"; In Proceedings of ACM Multimedia '95; 1995; 18 pages.

"Polycom Demonstrates High Definition (HD) Video on Industry Leading VSX Video Communications Platform"; Apr. 26, 2005; 2 pages.

Tim Hewson, Cliff McKnight, Anne Clarke, and Peter Marsh; "Video Communication"; Desktop Video AGOCG Report; Feb. 24, 1999; 48 pages.

Bill Birney and David Workman; "Determining the Shape of Pixels and Frames"; May 2003; 15 pages; Microsoft Corporation.

Paul Bourke; "YCC colour space and image compression"; Apr. 2000; 7 pages.

Fredo Durand and Julie Dorsey; "Fast Bilateral Filtering for the Display of High-Dynamic-Range Images"; International Conference on Computer Graphics and Interactive Techniques; 2002; pp. 257-266.

Armando Fox, Steven D. Gribble, Eric A. Brewer, and Elan Amir; "Adapting to Network and Client Variability via On-Demand Dynamic Distillation" Proceedings of the seventh international conference on Architectural support for programming languages and operating systems;1996; pp. 160-170.

Jefferson Han and Brian Smith; "CU-SeeMe VR Immersive Desktop Teleconferencing"; Proceeding of the Fourth ACM international conference on Multimedia; 1997; pp. 199-207.

Tohru Hoshi, Kenjiro Mori, Yasuhiro Takahashi Yoshiyuki Nakayama, and Takeshi Ishizaki; "B-ISDN Multimedia Communication and Collaboration Platform Using Advanced Video Workstations to Support Cooperative Work"; IEEE Journal on Selected Areas in Communications; Dec. 1992; pp. 1403-1412; vol. 10, No. 9.

A.B. Larsen and E.F. Brown; "'Continuous Presence' Video Conferencing at 1.5-6 Mb/sec"; Teleconferencing and Interactive Media, University of Wisconsin Extension Center for Interactive Programs; 1980; 8 pages.

D. Darian Muresan and Thomas M. Parks; "Optimal Recovery Demosaicing"; The IASTED Conference on Signal and Image Processing; 2002; 6 pages.

Roderick E. Perkins; "Spider: Investigation in Collaborative Technologies and Their Effects on Network Performance"; Global Telecommunications Conference; Dec. 1991; pp. 2074-2080; vol. 3.

Nicolas Roussel and Michel Beaudouin-Lafon; "VideoSpace: A Toolkit for Building Mediaspaces"; 1999; 11 pages.

Fred Sammartino and Dean Blackketter; "Desktop Multimedia Communications—Breaking the Chains"; 1991; 5 pages; Advanced Technology Group Apple Computer, Inc.

Scott R. Sharer; "What-Is 'HD'/'Hi-Def'"; Tandberg presentation; Aug. 2005; 43 pages.

Marc H. Willebeek-Lemair and Zon-Yin Shae; "Videoconferencing over Packet-Based Networks" IEEE Journal on Selected Ares in Communications; Aug. 1997; 1101-1114; vol. 15, No. 6.

"Polycom Executive Collection"; Jun. 2003; 4 pages; Polycom, Inc.; Pleasanton, CA.

Joe Duran and Charlie Sauer; "Mainstream Videoconferencing—A Developer's Guide to Distance Multimedia"; Jan. 1997; pp. 228-230; Addison Wesley Longman, Inc.

* cited by examiner

HIGH DEFINITION VIDEOCONFERENCING SYSTEM

PRIORITY

This application claims benefit of priority of U.S. Provisional Patent Application Ser. No. 60/676,905 titled "High Definition Videoconferencing System", filed on May 2, 2005, whose inventors are Michael L. Kenoyer and Craig B. Malloy, which is hereby incorporated by reference in its entirety as though fully and completely set forth herein.

This application is a continuation-in-part of application Ser. No. 11/252,238 titled "Video Conferencing System Transcoder", filed on Oct. 17, 2005 now U.S. Pat. No. 7,692,683, whose inventors are Michael L. Kenoyer and Michael V. Jenkins, which claims benefit of priority to provisional application Ser. No. 60/619,210 titled "Video Conference Call System," filed on Oct. 15, 2004, whose inventors are Jonathan W. Tracey, Craig B. Malloy, Michael L. Kenoyer, Michael V. Jenkins, Ashish Goyal and Michael J. Burkett, both of which are hereby incorporated by reference in their entirety as though fully and completely set forth herein.

BACKGROUND OF THE INVENTION

1. Field of the Invention

The present invention relates generally to communications and, more specifically, to video conferencing.

2. Description of the Related Art

People may communicate vocally through various devices including telephones, cellular phones, and Internet phones. People may also communicate with each other through audio and video connections. For example, in a video conference, cameras and microphones located at local and remote sites may capture video and audio of conference participants to transmit to the other respective site. In addition, each video conference site may include a display and a speaker for reproducing the received video and audio signals.

Current prior art video conferencing systems generally suffer from poor resolution and poor display capabilities. Current video conferencing systems may employ TV quality resolutions such as 704×576 or 704×480. Some specialized custom systems deliver higher HD resolutions up to 1920×1080 however they use 10-15 Megabits per second (Mbps) which makes them impractical due to the difficulty and prohibitive cost of the connection bandwidth. One problem with current prior art conferencing systems is generally the lack of realism, primarily due to lack of display quality and picture resolution.

Recently, high definition video displays (e.g., HDTV displays) have been introduced, offering higher resolutions of, e.g., 1280×720 pixels at 60 frames per second, 1920×1080 interlaced pixels at 60 fields or 30 full frames. These displays are designed for use with digital television delivered at bandwidths of 10 to 20 Mbps. However, one issue confronted by video conferencing system designers is generally the amount of bandwidth available to most users is at T1 or less, which is approximately 1.5 Mbps in the United States, and approximately 2 Mbps or less in Europe. Another issue relates to the amount of computing power necessary to generate encoded high definition signals in a videoconferencing system. Therefore, it would be desirable to provide improved video conferencing systems display and resolution capabilities in environments that support T1 or lower bandwidth capabilities.

Current video conferencing systems vendors have generally believed that network bandwidths of 3 Megabits per second or greater are required for high definition resolution video conferencing systems. Therefore, the major video conferencing systems vendors have not provided high definition capable video conferencing systems.

SUMMARY OF THE INVENTION

In some embodiments, a videoconferencing system may support high resolution, e.g., high definition television (HDTV), display capabilities. The videoconferencing system comprises a plurality of participant locations that may participate in the videoconference. Each participant location may comprise videoconferencing equipment, such as at least one camera, microphone(s), a display, one or more speakers, and a videoconferencing codec. The videoconferencing system may support various videoconferencing operations, including multi-way videoconferencing involving 3, 4, or more participants.

A first participant location comprises a camera operable to capture an image of a first participant location. The camera is preferably a high definition camera operable to acquire or capture images having a resolution compatible with HDTV or higher. In one embodiment, the camera is operable to acquire images having a high resolution, e.g., a resolution of at least 1280×720 pixels, at 30 frames per second. In other embodiments, the camera is operable to acquire images having greater resolutions, such as 1920×1080.

Videoconferencing equipment is coupled to the camera and operable to produce a video (and audio) stream based on the captured images. In one embodiment, the videoconferencing equipment comprises an H.264 encoder and is operable to encode the video stream of high definition images using H.264 encoding techniques. Other encoding or compression methods may also be used.

The videoconferencing equipment is operable to provide the H.264 encoded stream over a network, such as a local area network or a wide area network, e.g., the Internet, to a second (remote) participant location (or through a circuit switched network using a primary rate interface (PRI) at up to approximately 1.544 Mbps (T-1) in the US or approximately 2.048 Mbps (E-1) in Europe and Asia). The video stream comprises high resolution (or high definition) images of the first participant location. The high definition images may comprise 1280×720 pixels, e.g., each frame may comprise 1280×720 pixels. In one embodiment, high resolution may comprise 1280 times 720 times 30 progressive scans (720p30), or 1920×1080 interlaced (1080i) or 1920×1080 progressive scan (1080p or 1080p60). In other embodiments, even greater resolutions are desired. At least a portion of the network may operate at 1.544 Megabits per second or less bandwidth capability, e.g., at T1 bandwidth or less. Alternatively, at least a portion of the network may operate at 2.048 Megabits per second or less bandwidth capability The second participant location receives the H.264 encoded stream over the wide area network and may decode the stream for presentation on a display. The second participant location may utilize a high definition display, e.g., a HDTV display, to display the received video and audio. The HDTV display may utilize 720p, 1080i or 1080p, among other resolutions. In another embodiment, the second participant location may utilize a VGA monitor or other suitable display capable of displaying the high resolution of the received video signal.

In one embodiment, the videoconferencing system may support a plurality or all of the participants using HDTV displays that receive and display HDTV video streams. The videoconferencing system may support a continuous presence mode where a HDTV display displays one or more portions or windows having a HDTV resolution and one or more portions or windows having a lower resolution.

BRIEF DESCRIPTION OF THE DRAWINGS

A better understanding of the present invention may be obtained when the following detailed description is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation By Reference

U.S. Provisional Patent Application, titled "Temporal Filtering", which was filed Dec. 16, 2005, whose inventor is Michael V. Jenkins, is hereby incorporated by reference in its entirety as though fully and completely set forth herein.

U.S. patent application titled "Speakerphone", Ser. No. 11/251,084, which was filed Oct. 14, 2005, whose inventor is William V. Oxford is hereby incorporated by reference in its entirety as though fully and completely set forth herein.

U.S. patent application titled "Speakerphone Supporting Video and Audio Features", Ser. No. 11/251,086, which was filed Oct. 14, 2005, whose inventors are Michael L. Kenoyer, Craig B. Malloy and Wayne E. Mock is hereby incorporated by reference in its entirety as though fully and completely set forth herein.

U.S. patent application titled "High Definition Camera Pan Tilt Mechanism", Ser. No. 11/251,083, which was filed Oct. 14, 2005, whose inventors are Michael L. Kenoyer, William V. Oxford, Patrick D. Vanderwilt, Hans-Christoph Haenlein, Branko Lukic and Jonathan I. Kaplan, is hereby incorporated by reference in its entirety as though fully and completely set forth herein.

Figure 1:
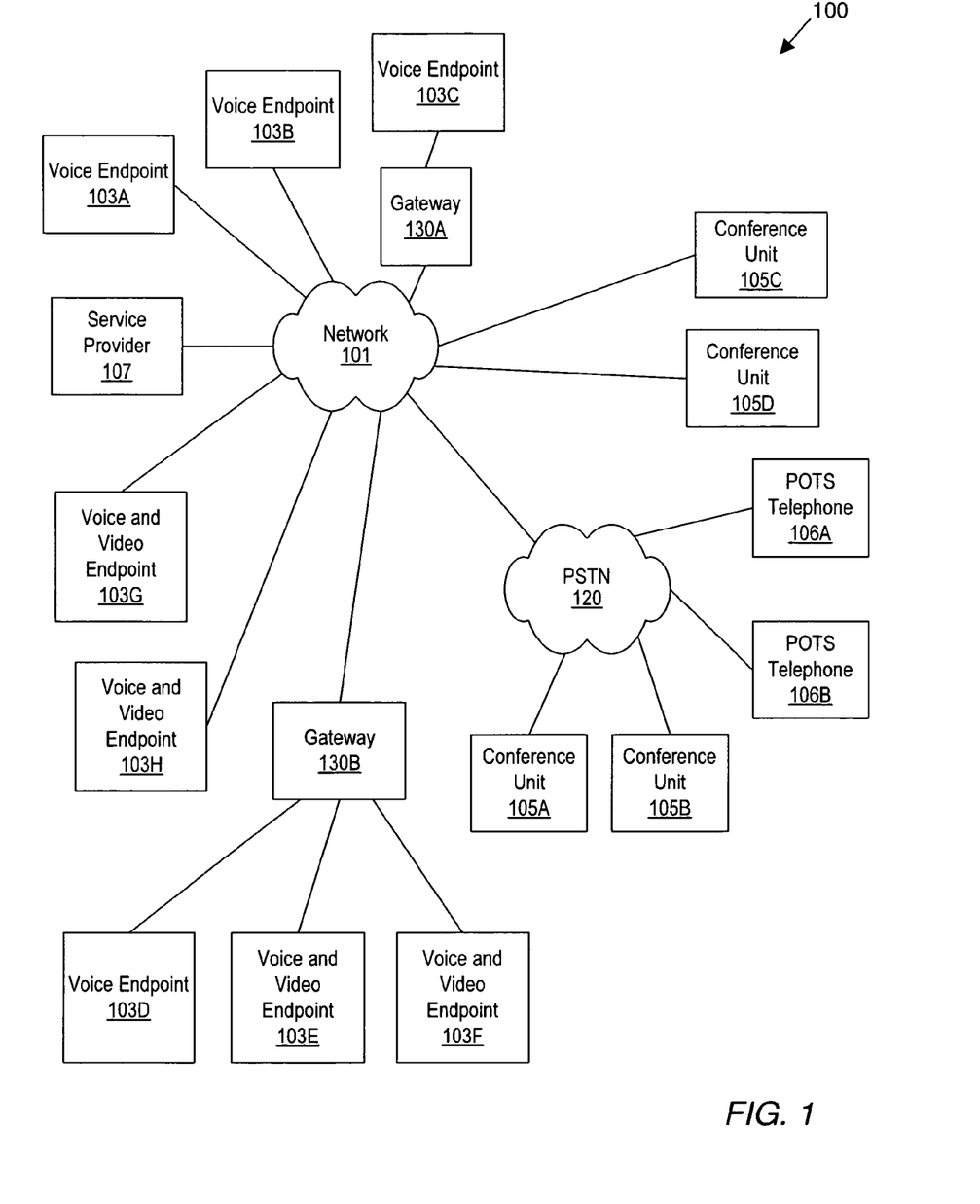
FIG. 1 illustrates a video conferencing system according to an embodiment.

FIG. 1 illustrates an embodiment of a videoconferencing system 100. Video conferencing system 100 comprises a plurality of participant locations or endpoints. FIG. 1 illustrates an exemplary embodiment of a videoconferencing system 100 which may include a network 101, endpoints 103A-103H (e.g., audio and/or video conferencing systems), gateways 130A-130B, a service provider 107 (e.g., a multipoint control unit (MCU)), a public switched telephone network (PSTN) 120, conference units 105A-105D, and plain old telephone system (POTS) telephones 106A-106B. Endpoints 103C and 103D-103H may be coupled to network 101 via gateways 130A and 130B, respectively, and gateways 130A and 130B may each include firewall, network address translation (NAT), packet filter, and/or proxy mechanisms, among others. Conference units 105A-105B and POTS telephones 106A-106B may be coupled to network 101 via PSTN 120. In some embodiments, conference units 105A-105B may each be coupled to PSTN 120 via an Integrated Services Digital Network (ISDN) connection, and each may include and/or implement H.320 capabilities. In various embodiments, video and audio conferencing may be implemented over various types of networked devices.

In some embodiments, endpoints 103A-103H, gateways 130A-130B, conference units 105C-105D, and service provider 107 may each include various wireless or wired communication devices that implement various types of communication, such as wired Ethernet, wireless Ethernet (e.g., IEEE 802.11), IEEE 802.16, paging logic, RF (radio frequency) communication logic, a modem, a digital subscriber line (DSL) device, a cable (television) modem, an ISDN or PRI device, an ATM (asynchronous transfer mode) device, a satellite transceiver device, a parallel or serial port bus interface, and/or other type of communication device or method.

In various embodiments, the methods and/or systems described may be used to implement connectivity between or among two or more participant locations or endpoints, each having voice and/or video devices (e.g., endpoints 103A-103H, conference units 105A-105D, POTS telephones 106A-106B, etc.) that communicate through various networks (e.g., network 101, PSTN 120, the Internet, etc.).

Endpoints 103A-103C may include voice conferencing capabilities and include or be coupled to various audio devices (e.g., microphones, audio input devices, speakers, audio output devices, telephones, speaker telephones, etc.). Endpoints 103D-103H may include voice and video communications capabilities (e.g., video conferencing capabilities) and include or be coupled to various audio devices (e.g., microphones, audio input devices, speakers, audio output devices, telephones, speaker telephones, etc.) and include or be coupled to various video devices (e.g., monitors, projectors, displays, televisions, video output devices, video input devices, cameras, etc.). In some embodiments, endpoints 103A-103H may comprise various ports for coupling to one or more devices (e.g., audio devices, video devices, etc.) and/or to one or more networks.

Conference units 105A-105D may include voice and/or video conferencing capabilities and include or be coupled to various audio devices (e.g., microphones, audio input devices, speakers, audio output devices, telephones, speaker telephones, etc.) and/or include or be coupled to various video devices (e.g., monitors, projectors, displays, televisions, video output devices, video input devices, cameras, etc.). In some embodiments, endpoints 103A-103H and/or conference units 105A-105D may include and/or implement various network media communication capabilities. For example, endpoints 103A-103H and/or conference units 105C-105D may each include and/or implement one or more real time protocols, e.g., session initiation protocol (SIP), H.261, H.263, H.264, H.323, among others. In the currently preferred embodiment, endpoints 103A-103H implement H.264 encoding for high definition video streams.

In various embodiments, a codec may implement a real time transmission protocol. In some embodiments, a codec (which may be short for "compressor/decompressor") may comprise any system and/or method for encoding and/or decoding (e.g., compressing and decompressing) data (e.g., audio and/or video data). For example, communication applications may use codecs to convert an analog signal to a digital signal for transmitting over various digital networks (e.g., network 101, PSTN 120, the Internet, etc.) and to convert a received digital signal to an analog signal. In various embodiments, codecs may be implemented in software, hardware, or a combination of both. Some codecs for computer video and/or audio may include MPEG, Indeo, and Cinepak, among others.

At least one of the participant locations includes a camera for acquiring high resolution or high definition (e.g., HDTV compatible) signals, as discussed further below. At least one of the participant locations includes a high definition display (e.g., an HDTV display), for displaying received video signals in a high definition format, as discussed further below. As used herein, the term "high definition display" includes displays that are capable of displaying "high resolution" video images, wherein the term "high resolution" is described below. Thus, high definition displays include HDTV displays, VGA displays, In one embodiment, at least a portion of the network 101 may be 1.544 Mbps or less (e.g., T1 or less), also sometimes referred to as 1.5 Mbps. In another embodiment, at least a portion of the network is 2.048 Mbps or less, also sometimes referred to as 2 Mbps. Thus, one of the embodiments of the present invention comprises a video conferencing system that is designed to operate with network infrastructures that support T1 capabilities or less, e.g., 1.544 Mbps or less in one embodiment, and 2.048 Mbps in other embodiments.

The video conferencing system supports high definition capabilities. The term "high definition" includes displays with resolution of 1280×720 pixels and higher. In one embodiment, high-definition resolution may comprise 1280× 720 progressive scan at 30 or 60 frames per second, or 1920× 1080 interlaced or 1920×1080 progressive. Thus, in one embodiment, a video conferencing system may support high definition "e.g. similar to HDTV" display capabilities using network infrastructures with bandwidths T1 capability or less. The term "high-definition" is intended to have the full breath of its ordinary meaning and includes "high resolution".

Figure 2:
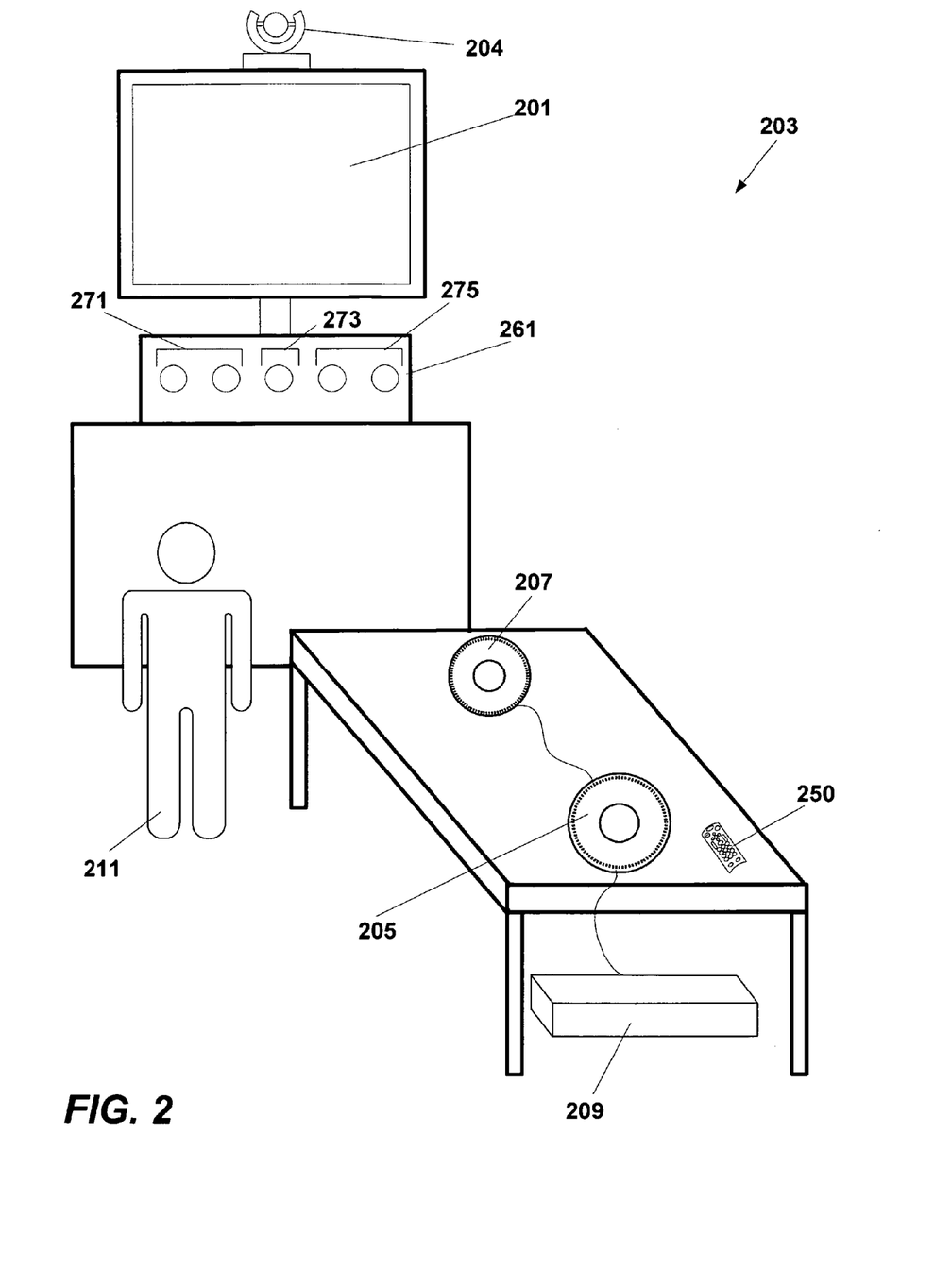
FIG. 2 illustrates a participant location or conferencing unit, according to an embodiment.

FIG. 2 illustrates an embodiment of a participant location, also referred to as an endpoint or conferencing unit (e.g., a video conferencing system). In some embodiments, the video conference system may have a system codec 209 to manage both a speakerphone 205/207 and a video conferencing system 203. For example, a speakerphone 205/207 and a video conferencing system 203 may be coupled to the integrated video and audio conferencing system codec 209 and may receive audio and/or video signals from the system codec 209.

In some embodiments, the speakerphone 205/207 may be a high quality speakerphone. For example, in some embodiments, 16 microphones may be radially distributed around a center speaker. Other numbers of microphones and speakers may also be used. The microphones may be radially distributed to enhance detection of an in-room participant's voice from multiple angles relative to the speakerphone 205/207.

In some embodiments, the participant location may include a high definition camera 204 for acquiring high definition images of the participant location. In other words, the high definition camera 204 is capable of acquiring high resolution and/or high definition images from a field of view. The high definition camera 204 may be a high definition pan tilt zoom camera. In other words, the high definition camera 204 may be a pan tilt zoom camera (capable of panning, tilting, and zooming) that supports capture of high resolution and/or high definition images from a field of view. The high definition camera 204 preferably provides a digital interface, and hence can use smaller cabling than a tradition camera using an analog interface.

High definition images acquired by the camera 204 may be displayed locally on the display 201 and may also be encoded and transmitted to other participant locations in the videoconference. In some embodiments, data from camera 204 may be provided to the video conferencing system 203 through a digital link from the camera 204. The data may be processed external to the camera 204 (e.g., with logic of the system codec 209). In some embodiments, the data may be processed inside the camera 204. The participant location may also include a high definition display 201 (e.g., a HDTV display).

In some embodiments, the HD camera 204 may use a one megapixel window out of a two megapixel imager. Other image windows and sizes are also contemplated. In some embodiments, an imager from a digital still camera may be used. In some embodiments, the window may be sampled at 30 frames per second (other sampling rates are also contemplated). In some embodiments, a TV camera supporting interlacing may be used. In some embodiments, the HD camera 204 may use a wide angle camera lens (e.g., with a 70 degree field of view). Thus the HD camera 204 does not require a separate wide angle adapter. Other fields of view are also contemplated. The camera 204 may use a native wide angle lens or a wide angle lens adapter. In some embodiments, the camera 204 may not be a wide angle camera.

The participant location may also include a sound system 261. The sound system 261 may include multiple speakers including left speakers 271, center speaker 273, and right speakers 275. Other numbers of speakers and other speaker configurations may also be used. In some embodiments, the video conferencing system 203 may include a camera 204 for capturing video of the conference site. In some embodiments, the video conferencing system 203 may include one or more speakerphones 205/207 which may be daisy chained together.

The video conferencing system components (e.g., the camera 204, display 201, sound system 261, and speakerphones 205/207) may be coupled to a system codec 209. The system codec 209 may receive audio and/or video data from a network 101. The system codec 209 may send the audio to the speakerphone 205/207 and/or sound system 261 and the video to the display 201. The received video may be high definition video that is displayed on the high definition display 201. The system codec 209 may also receive video data from the camera 204 and audio data from the speakerphones 205/207 and transmit the video and/or audio data over the network 101 to another conferencing system. In some embodiments, the conferencing system may be controlled by a participant through the user input components (e.g., buttons) on the speakerphone 205/207 and/or remote control 250. Other system interfaces may also be used.

Figure 3:
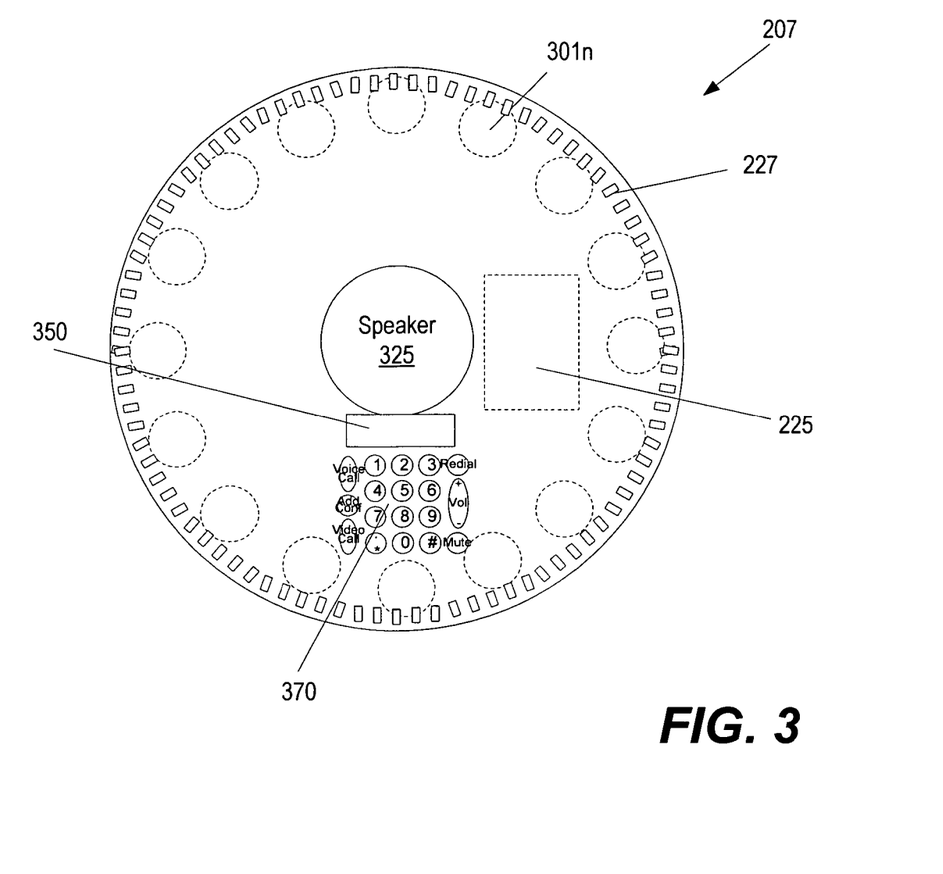
FIG. 3 illustrates a speakerphone, according to an embodiment.

FIG. 3 illustrates an exemplary embodiment of a speakerphone. In some embodiments, the speakerphone 207 may be round and include along it perimeter a circular array of microphones 301*n*. In some embodiments, a speaker 325 may be included in the center of the speakerphone 207. The center speaker 325 may provide sound from offsite participants, while the microphones 301n may capture sound from in-room participants to transmit to offsite participants. The speakerphone 207 may comprise control logic 225 that controls the speaker 325, microphones 301n, and various functions of the speakerphone 207. In some embodiments, the speakerphone 207 may have a circular array of indicator lights 227. Other shapes and locations of indicator lights 227 are also contemplated. In some embodiments, the indicator lights 227 (or subsets of the indicator lights 227 may be have different color lights to indicate different statuses). For example, subsets of the indicator lights 227 may flash red to indicate the speakerphone 207 is muted. In some embodiments, the speakerphone 207 may have a keypad 370. In some embodiments, the speakerphone 207 may have a display 350 (e.g., an electronic display) to indicate various information about the speakerphone 207.

Figure 4:
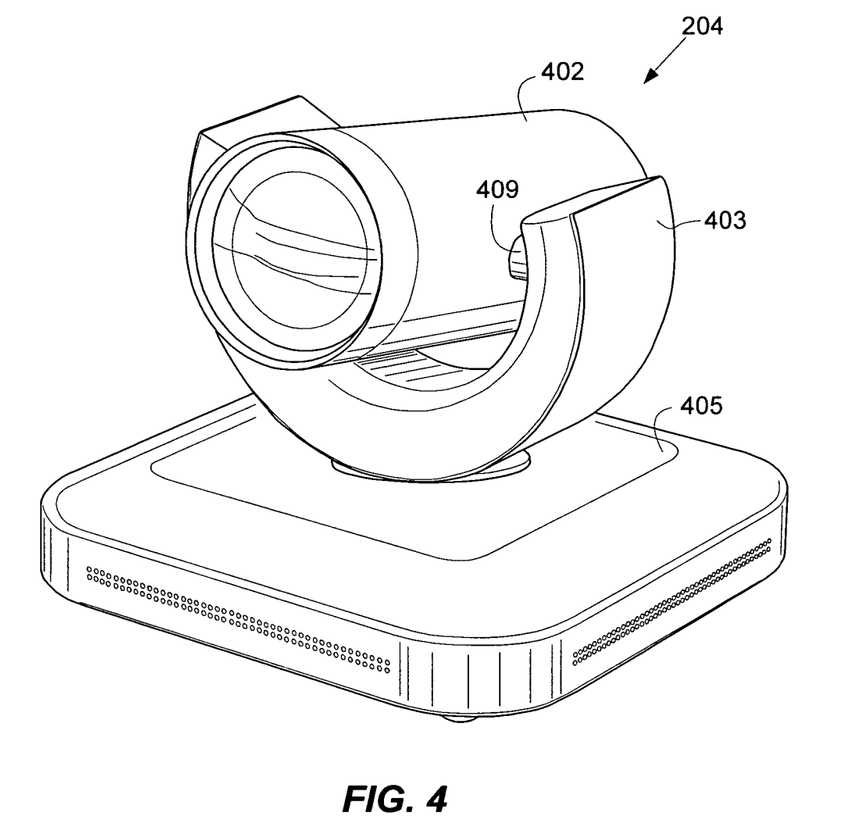
FIG. 4 illustrates a high definition camera, according to an embodiment.

FIG. 4 illustrates an embodiment of a camera 204. In some embodiments, the camera 204 may include a lens portion 402 coupled to bracket arms 403 through a rod 409. The lens portion 402 may be configured to generate high definition images. The bracket arms 403 may be coupled to the base 405 through a central shaft. The camera 204 may be controlled by one or more motors in the camera's base 405. In some embodiments, a tilt motor in the camera base 405 may control the tilt of the camera 204, while a pan motor in the camera base 405 may pan the camera 204. In some embodiments, commands to move the camera 204 may be sent from the system codec 209.

The camera 204 may be a high definition camera, e.g., the camera may be able to acquire 1280×720 pixels, or 1920×1080 pixels. The high definition camera 204 includes an image sensor (e.g., charge coupled device (CCD)) designed to generate at least a high definition or greater number of pixels on its image sensor. In another embodiment, the video conferencing system comprises a camera 204 that is not itself high definition, and pixel interpolation is used to generate a high definition image, i.e., to increase the pixel resolution of the image acquired from the camera 204. The use of a lower resolution camera 204 may be primarily for cost reasons.

Figure 5:
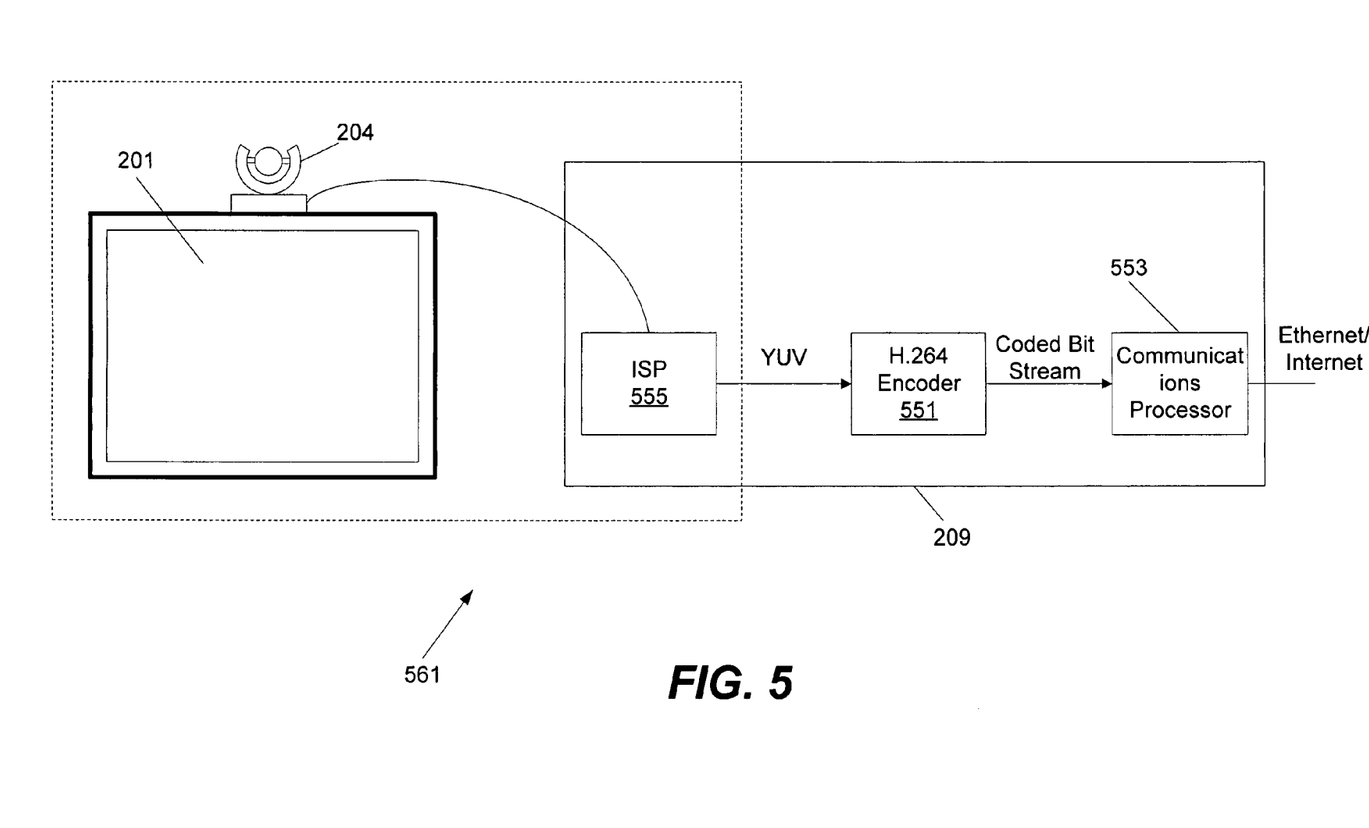
FIG. 5 is a flowchart illustrating a method for operating a video conferencing system using HDTV capable video resolutions and displays.

Referring to FIG. 5, a camera 204 captures a plurality of images at a first participant location 561, wherein each of the captured images has a high resolution. The term "high resolution", for example, comprises images of resolution of 1280×720 pixels and higher. The camera 204 may operate to acquire 5, 10, 15, 24, 30, 45, 60, or 120 or more frames per second.

The plurality of images are then provided to an encoder 551. The encoder 551 encodes the video stream based on the plurality of images to produce an encoded video stream. The video stream is preferably encoded using H.264 encoding, wherein the encoded video stream comprises high definition images of the first participant location.

For example, the electromagnetic radiation is sensed by sensors in the camera 204 which provide a signal that is digitized (e.g., RGB Bayer format) and provided to an image sensor pipeline (ISP) 555, or a plurality of ISPs operating in parallel. The ISP 555 may be comprised in the camera 204 or in a separate unit. Placing the ISP 555 in a separate unit may provide cost savings over placing the ISP 555 in the camera 204. The ISP 555 may include an interpolator, fixed pattern noise logic, gain correction logic, a temporal filter, adaptive edge sharpening logic, auto white balance logic, auto backlight logic, automatic gain control logic, color space conversion logic, histogram stretching logic, and auto focus logic. The ISP 555 may also include other logic. The interpolator may receive pixels from the image sensor in an RGB Bayer format and convert the pixels to an RGB format. The RGB signals are then provided through various stages of the ISP to perform one or more of, or a plurality of, noise reduction, gain correction, filtering, edge sharpening, white balance, backlighting, gain control, color space conversion, histogram stretching and auto focus, as necessary. The ISP 555 may output pixels in a YUV format.

The YUV format pixels are provided to a H.264 encoder 551, or a plurality of respective H.264 encoders operating in parallel, that generates a coded bit stream. As used herein, the term "H.264" and "H.264 encoding" comprises the current H.264 standard as well as later versions. The H.264 encoding may use various encoding or compression techniques, such as a 4×4 or 8×8 integer transform conceptually similar to the Discrete Cosine Transform (DCT), motion vectors, etc. The coded bit stream output from the H.264 encoder 551 is provided to a communication processor 553. The encoders may be implemented using one or more digital signal processors (DSPs), one or more ASICs (application specific integrated circuits), or any other type of logic.

In some embodiments, a signal to be encoded may be divided into "slices" (e.g., horizontal slices) for multiple DSPs. Each DSP may process one or more slices. In addition, DSPs may share data (e.g., data on slice boundaries and/or reference data between slices) to produce motion vectors with optimal efficiency (e.g, to produce motion vectors that may cross slice boundaries). In some embodiments, data may not be shared (e.g., motion vectors may be calculated that do not cross boundaries and the resultant slice edges may be blurred using a filter). Other processing methods are also contemplated. In some embodiments, DSPs may work specifics parts of the process instead of (or in addition to) processing different parts of the data. For example, one DSP may perform motion estimation and pipeline the data to a second DSP that performs quantization. In some embodiments, the processing may be provided on a single chip.

In various embodiments, temporal filtering may be used to reduce noise over time in a series of video frames. A temporal filter may use last filtered frames to reduce the noise in a current frame. For example, a temporal filter may filter noise in still parts of an image more strongly than in moving parts of the image. In other embodiments, motion adaptive temporal filtering may be used.

In some embodiments, a temporal filter requiring less processing power may include a method for detecting motion between a set of pixels and applying the temporal filter based on the detected motion. For example, if substantial motion is not detected, the temporal filter for the block of pixels may be stronger (i.e., reduce more noise) than the temporal filter applied to a block of pixels for which substantial motion has been detected (in which case a weak temporal filter or no filter may be applied).

Figure 6:
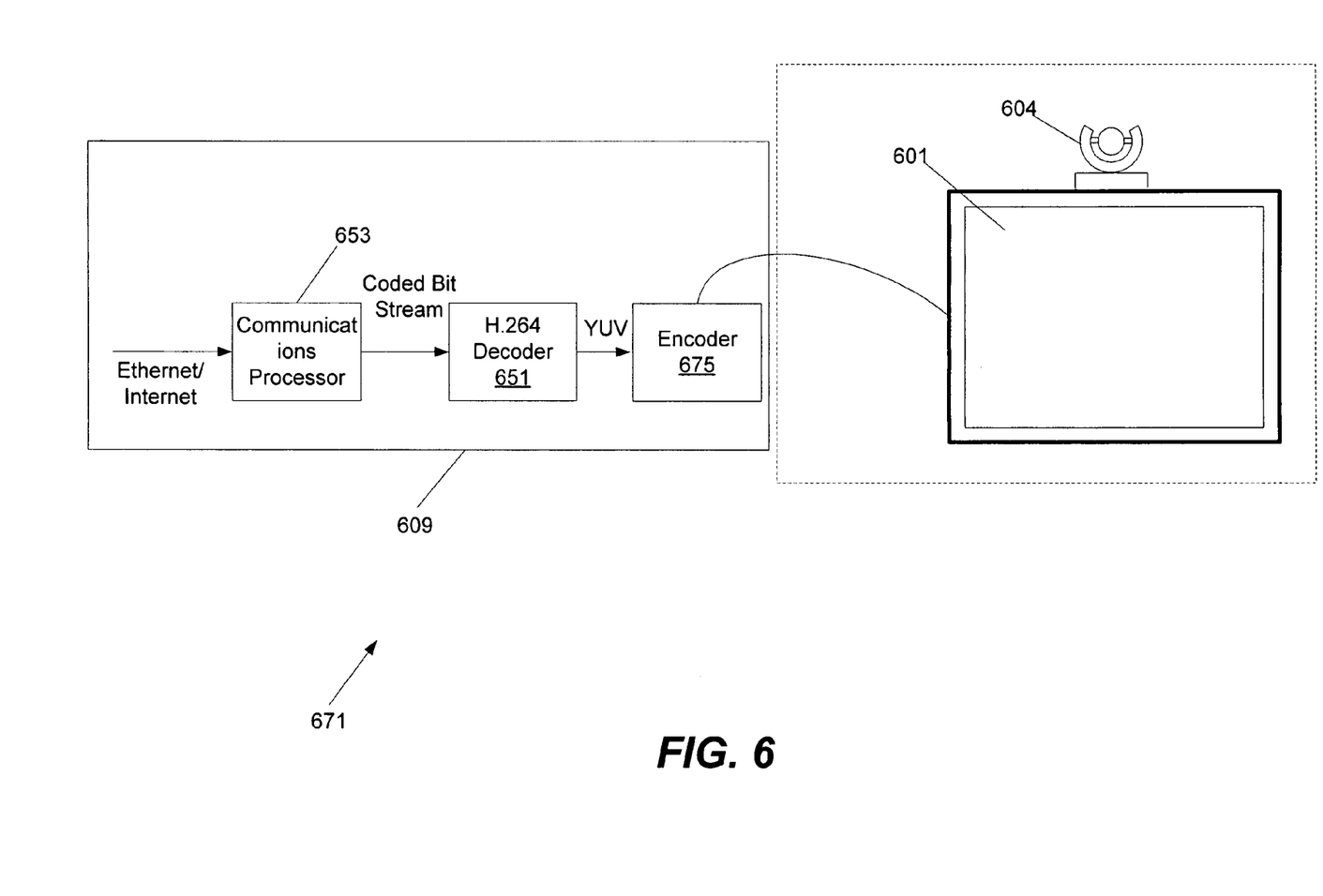
FIG. 6 illustrates a high definition receiving video conferencing system participant location, according to an embodiment.

As seen in FIG. 6, the encoded video stream is then provided over a wide area network to a remote participant location 671, wherein the wide area network operates at 1.5 Mbps or less bandwidth capability. For example, the communication processor 553 may operate to generate packets, e.g., UDP packets (or TCP/IP packets, Ethernet packets, etc.), containing digital data corresponding to the image. The H.264 coded bit stream containing high resolution image frames is then output across one or more networks, e.g., the Internet, to a remote participant location 671. As noted above, at least a portion, or all, of the network in which this digital data is transmitted is preferably at T1 capability or less, e.g., 1.5 Mbps or less. Alternatively, or in addition, at least a portion (or all) of the wide area network bandwidth may be T1 capability or less, e.g., 1.5 Mbps or less, or 2 Mbps or less. The H.264 encoder 551 preferably uses as much bandwidth as is available to encode the high definition video. It is noted that, due to the network bandwidth being 1.5 Mbps or less, some information captured by the camera will be lost in the encoding process. In some embodiments, the audio and video data may be included in the 1 Mbps stream (e.g., the audio portion of the stream may take approximately 128 kbps). Other stream size and audio portions are also contemplated. For example, in some embodiments, a 48 kbps audio portion may be sufficient to provide 22 kHz performance for the speakerphone.

At the remote participant location 671, the coded bit stream is received by the communications processor 653 and is decoded at decoder 651 (e.g., inside system codec 609). Decoding the encoded video stream at the remote participant location 671 produces the plurality of images. It is noted that the decoded plurality of images may have a reduced set of information as compared to the originally acquired or captured images. For example, due to the limited bandwidth of the communication channel (e.g., at 1.5 Mbps or less), the H.264 encoding may involve a lossy encoding or compression.

The plurality of images may then be displayed on a high resolution display 601 at the remote participant location 671. For example, the decoded stream may then be provided, optionally through digital to analog (D/A) converters (such as encoder 675), to a high definition device such as a HDTV capable device (e.g., an HDTV display or projector). The signal to the HDTV may be an analog signal or a digital signal (e.g., digital video input (DVI) or High-Bandwidth Digital Content Protection HDCP). The high definition or high resolution (e.g., HDTV) display 601 displays the images to provide a live video display, e.g., at a high resolution and at 60 frames per second. Thus these participants see a video display of the other participants in an HDTV format.

In some embodiments, the H.264 standard may provide for 2-3 times better compression with high definition as compared to H.261 and H.263, or MPEG-1 or MPEG-2, which have historically been used in videoconferencing systems. As noted above, due to the network bandwidth being 1.5 Mbps or less, some information captured by the camera 604 may be lost in the encoding process. However, the inventors have realized that the higher resolution of the HDTV compensates for this lost information, and provides a visually pleasing display.

As noted above, the videoconferencing system may comprise a plurality of the above components in parallel to perform the processing of the high definition video data. For example, the system may include a plurality of H.264 encoders that operate in parallel on different portions of the data to accomplish the encoding of the high definition video data. The system may also include a plurality of ISPs operating in parallel on the high definition image data received from the camera.

Figure 7:
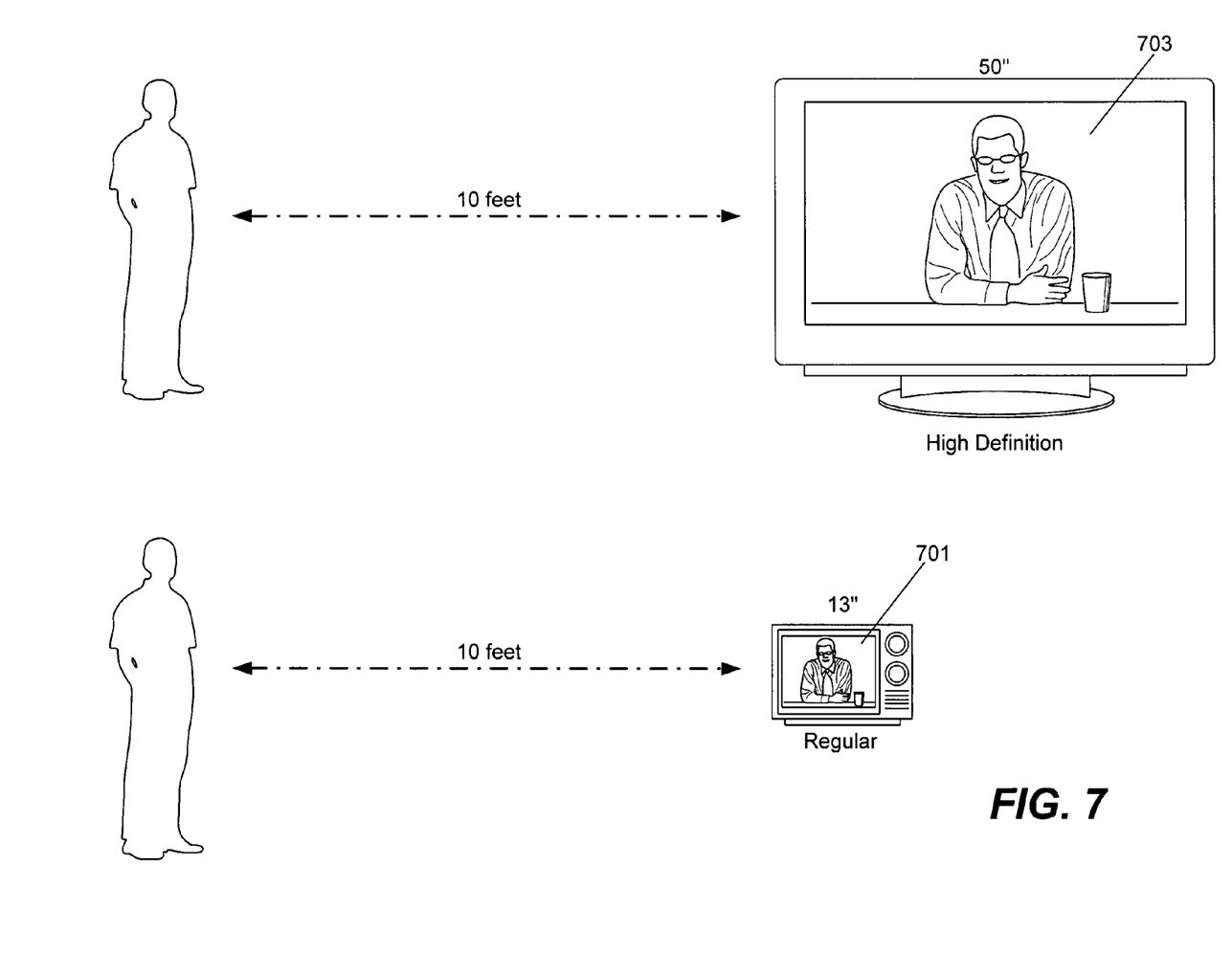
FIG. 7 illustrates various distances that may be employed when viewing images in a videoconference.

FIG. 7 illustrates various distances that may be employed when viewing images in a videoconference. As shown, the conventional distance at which videoconferencing system participants view a videoconference is approximately 10 feet. This conventional view distance is not well suited to conventional prior art videoconferencing systems. When a 352×288 pixel Full Common Intermediate Format (FCIF) image is displayed on a large screen at typical conferencing room distances, e.g., a 50 inch display at a distance of 10 feet from the viewer, any distortions or imperfections in the image are magnified and easily detected by video conference participants, and the individual pixels are also discernible. The visual acuity of the human eye is such that the viewer would have to be approximately 33 feet away from that same image (a FCIF image on a 50 inch display) for the pixels to not be discernible. For example, the optimum distance for viewing a 352×288 pixel FCIF image displayed on a 13 inch high display 701 without visually distinguishing artifacts (and, for example, imaging defects) may be approximately 10 feet. Stated another way, the optimum screen size for viewing a 352×288 pixel FCIF image at a distance of approximately 10 feet without visually distinguishing artifacts (and, for example, imaging defects) would be a 13 inch high display 701. Of course, a 13 inch display is not suitable for a videoconference.

In contrast, at a conventional participant distance of approximately 10 feet, the optimum screen size for an HD image would be a 50 inch high display 703. Stated another way, an HD image may have an optimum distance on a 50 inch high display of approximately 10 feet, which also happens to be the most common distance between participants and the display. At this typical distance, the individual pixels on an HD display are not visible. Any defects or imperfections are also less visible, especially using H.264 encoding where the minimum macroblock size is 4×4 pixels, which tends to reduce visible errors. Thus, the distortions and imperfections on the HD image are less visible and therefore, the HD image can be displayed on a larger screen at a closer distance without noticing the visual defects. In addition, because moving objects on the display may occupy a smaller area of the image, less bitrate may be required for transmitting moving portions of the image. The resulting larger tolerance for defects further allows HD video conferencing at 1.5 Mbps. Therefore, the combination of H.264 encoding, screen size, conventional conference room viewing distances, and screen resolution/pixel size enables high definition videoconferencing to provide a much greater visual experience to participants.

In some embodiments, a new I frame (a new frame updating each pixel) may not need to be sent on a shortened periodic basis. For example, the system may send updates to the previous frames (e.g., motion vectors, etc.) with a much smaller bitrate than systems which send periodic I frames. In some embodiments, I frames may be sent. In some embodiments, an I frame may be 10-15 times less efficient than other frames (or frame updates). Using fewer I frames may also allow HD video conferencing at 1 Mbps.

In some embodiments, 1280×720 at 30 progressive frames per second may be implemented. One Mbps may be used for video and audio (e.g., 128 kbps of the 1 Mbps may be used for audio—the actual video bit rate may be approximately 896 kbps). Other embodiments may use different ratios for audio and video. In some embodiments, the system may operate at lower frame rates (e.g., 15, 10 and 5 frames per second such as in low light situations to increase the integration time of each frame). The lower frame rates may also be used in order to reduce the bit rate below even 1.5 Mbps or to support higher resolutions. Other frame rates are also contemplated.

In some embodiments, high definition format (e.g., HD standards) may include 1280×720 resolution used for 720p30 format (720 lines of progressive scan resolution at 30 frames per second). HD standards may also include 1280×720 at 60 progressive frames per second (720p60 or 720p). Other HD standards include 1920×1080 at 60 interlaced fields per second where each field may be 1920×560 (which may be designated 1080i (e.g., 1080i60)). Another HD standard is 1920×1080 at 60 progressive frames per second or 1080p (e.g., 1080p60). The resolutions may also be defined at 24 fps (which may also be used for cinema applications). Even higher resolutions (e.g., 4096×2180 at 24 fps for the Digital Cinema Initiative or Super HD (SHD) at 3840×2048 at 24 fps pixels) may be supported for video conferencing using the above described systems. For example, improved video compression algorithms and/or lower frame rates (i.e. 24, 15, 10 or 5 fps) may be used to allow those higher resolutions to be coded at 1.5 Mbps or less).

Thus, for the first time, embodiments of the invention provide high definition (HDTV) videoconferencing over networks operating at T1 capability or less.

Embodiments of the video processing, encoding, transmission, and/or decoding methods may be implemented by program instructions stored on a memory medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network. In some embodiments, field programmable gate arrays may be used.

In some embodiments, a carrier medium may be used. Various embodiments further include receiving or storing instructions and/or data implemented in accordance with the foregoing description upon a carrier medium. A carrier medium may include a memory medium as described above, as well as signals such as electrical, electromagnetic, or digital signals, conveyed via a communication medium such as a bus, network and/or a wireless-link.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A videoconferencing system, comprising:
   a camera operable to capture a plurality of high definition images of a first participant location, wherein the high definition images comprise a resolution of at least 1920×1080;
   a videoconferencing device coupled to the camera and operable to provide a video stream to a remote participant location, wherein the video stream comprises a compressed stream of the plurality of high definition images of the first participant location, wherein the video stream comprises non-periodic I frames; and
   wherein the videoconferencing system is configured to provide the video stream over a network at 1.544 Megabits per second or less bandwidth at 30 frames per second or greater.

2. The videoconferencing system of claim 1, wherein the camera is a high definition camera.

3. The videoconferencing system of claim 1, wherein the camera is a high definition camera that supports two or more of pan, tilt and zoom capabilities.

4. The videoconferencing system of claim 1, wherein the camera is a high definition camera that supports pan, tilt and zoom capabilities.

5. The videoconferencing system of claim 1, wherein the camera provides a digital interface to the videoconferencing device.

6. The videoconferencing system of claim 1, further comprising:
   a high definition display located at the remote participant location and operable to display the video stream in a high definition format.

7. The videoconferencing system of claim 1, wherein the videoconferencing device comprises an H.264 encoder operable to encode the video stream using H.264 encoding prior to providing the stream over the network.

8. The videoconferencing system of claim 1, wherein at least a portion of the network operates at 1.544 Megabits per second or less bandwidth capability.

9. A videoconferencing system, comprising:
   a videoconferencing device located at a first participant location, wherein the videoconferencing device is coupled to a network and operable to receive an encoded video stream, wherein the videoconferencing device is configured to receive the encoded video stream at 1.544 Megabits per second or less bandwidth, wherein the encoded video stream comprises high definition images of the first participant location at 30 frames per second or greater, wherein the high definition images have a resolution of at least 1920×1080, wherein the encoded video stream is encoded using H.264 encoding, wherein the encoded video stream comprises non-periodic I frames, wherein the videoconferencing device comprises a decoder for decoding the encoded video stream; and
   a high definition display coupled to the videoconferencing device and located at a remote participant location, wherein the high definition display is operable to display the high definition images in a high definition format.

10. The videoconferencing system of claim 9, wherein at least a portion of the network operates at 1.5 Megabits per second or less bandwidth capability.

11. A method for operating a videoconference, comprising:
   capturing a plurality of images of a first participant location in the videoconference, wherein each of the captured images has a high resolution, wherein the high resolution is at least 1920×1080;
   encoding a video stream based on the plurality of images, wherein the video stream is encoded using H.264 encoding, wherein the video stream comprises non-periodic I frames;
   providing the video stream to a remote participant location in the videoconference for display on a high resolution display at the remote participant location, wherein the video stream comprises high definition images of the first participant location; and wherein the videoconferencing system provides the video stream over a network at 1.544 Megabits per second or less bandwidth at 30 frames per second or greater.

12. The method of claim 11, wherein at least a portion of the network operates at 1.5 Megabits per second or less bandwidth capability.

13. A method for operating a videoconference, comprising:
receiving an encoded video stream over a wide area network at a participant location in the videoconference, wherein the encoded video stream is received by the participant location at 1.544 Megabits per second or less bandwidth, wherein the encoded video stream comprises an encoded plurality of high definition images, at 30 frames per second or greater, wherein the plurality of high definition images have a resolution of at least 1920×1080, wherein the video stream comprises non-periodic I frames, wherein the video stream is encoded using H.264 encoding;
decoding the encoded video stream at a remote participant location to produce the plurality of high definition images; and
displaying the plurality of high definition images on a high resolution display at the participant location in the videoconference.

14. A method for operating a videoconferencing system, comprising:
capturing a plurality of high definition images of a first participant location in the videoconference;
encoding a video stream based on the plurality of high definition images to produce an encoded video stream, wherein the video stream is encoded using H.264 encoding, wherein the encoded video stream comprises high definition images of the first participant location at 30 framer per second or greater, wherein the high definition images comprise a resolution of at least 1920×1080, and wherein the video stream comprises non-periodic I frames;
providing the encoded video stream over a wide area network to a remote participant location in the videoconference, wherein the video stream is provided at 1.5 Megabits per second or less bandwidth;
decoding the encoded video stream at the remote participant location to produce the plurality of high definition images; and
displaying the plurality of high definition images on a high definition display at the remote participant location.

15. A videoconferencing system, comprising:
a camera operable to capture a plurality of high definition images of a first participant location;
a videoconferencing device coupled to the camera and operable to provide a video stream to a remote participant location, wherein the video stream comprises the plurality of high definition images of the first participant location at 30 framer per second or greater, wherein the high definition images comprise a resolution of at least 1920×1080, and wherein the video stream comprises non-periodic I frames; and
wherein the videoconferencing system is configured to provide the video stream over a network, wherein at least a portion of the network operates at 1.544 Megabits per second or less bandwidth capability.

* * * * *